United States Patent
Ozawa

(10) Patent No.: US 10,970,023 B2
(45) Date of Patent: Apr. 6, 2021

(54) PRINTING SYSTEM FOR DIRECTLY TRANSMITTING A PRINT JOB TO PRINTER WHEN A SERVER IS UNAVAILABLE AND PRINTER DRIVER PROGRAM

(71) Applicant: KONICA MINOLTA, INC., Tokyo (JP)

(72) Inventor: Tomohiro Ozawa, Tama (JP)

(73) Assignee: Konica Minolta, Inc., Tokyo (JP)

( * ) Notice: Subject to any disclaimer, the term of this patent is extended or adjusted under 35 U.S.C. 154(b) by 158 days.

(21) Appl. No.: 16/048,900

(22) Filed: Jul. 30, 2018

(65) Prior Publication Data

US 2019/0050184 A1    Feb. 14, 2019

(30) Foreign Application Priority Data

Aug. 8, 2017    (JP) .............................. JP2017-153606

(51) Int. Cl.
*G06F 3/12* (2006.01)
(52) U.S. Cl.
CPC .......... *G06F 3/1276* (2013.01); *G06F 3/1222* (2013.01); *G06F 3/1238* (2013.01); *G06F 3/1275* (2013.01); *G06F 3/1288* (2013.01); *G06F 3/121* (2013.01)
(58) Field of Classification Search
CPC ....... G06F 3/1276; G06F 3/1275; G06F 3/121
See application file for complete search history.

(56) References Cited

U.S. PATENT DOCUMENTS

| | | | |
|---|---|---|---|
| 9,774,750 B1* | 9/2017 | Zehler | G06F 3/121 |
| 2012/0092721 A1* | 4/2012 | Jaudon | G06F 3/1225 358/1.15 |
| 2012/0105908 A1* | 5/2012 | Tsutsumi | G06F 3/1234 358/1.15 |
| 2016/0054963 A1* | 2/2016 | Hamada | G06F 3/1273 358/1.15 |
| 2016/0080585 A1* | 3/2016 | Kobayashi | H04N 1/00204 358/1.15 |
| 2017/0090830 A1* | 3/2017 | Tomono | G06F 3/1235 |
| 2018/0293035 A1* | 10/2018 | Hakamata | G06F 3/1267 |

FOREIGN PATENT DOCUMENTS

| | | |
|---|---|---|
| JP | 2012-064004 A | 3/2012 |
| JP | 2016-085504 A | 5/2016 |

* cited by examiner

*Primary Examiner* — Benjamin O Dulaney

(74) *Attorney, Agent, or Firm* — Buchanan Ingersoll & Rooney PC

(57) ABSTRACT

A printing system includes: a printer driver; a server that receives a print job, and transfers the received print job; and a printing apparatus that executes the print job, the server including: a management part that stores and manages print management information; and a hardware processor that determines whether to permit printing concerning a print job, the printer driver having functions as: a job creation part that creates a print job; a duplication management part that acquires, stores, and manages a duplication of the print management information; a confirmation part that confirms whether the server is available; a print permission confirmation part that requests the server to determine whether to permit printing if the server is available, and determines whether to permit printing by using the print management information if the server is unavailable; and a direct transmission part that directly transmits the print job to the printing apparatus.

22 Claims, 9 Drawing Sheets

PRINTING SYSTEM FOR DIRECTLY TRANSMITTING A PRINT JOB TO PRINTER WHEN A SERVER IS UNAVAILABLE AND PRINTER DRIVER PROGRAM

The entire disclosure of Japanese patent Application No. 2017-153606, filed on Aug. 8, 2017, is incorporated herein by reference in its entirety.

BACKGROUND

Technological Field

The present invention relates to a printing system that performs printing via a print server, and a printer driver program that creates a print job in the printing system.

Description of the Related Art

In recent years, a printing system that transmits a print job to a printing apparatus via a print server is in widespread use. For example, in a printing system compatible with so-called ubiquitous printing that enables printing on any printing apparatus connected to a network, printing is performed in the following sequence. First, a print job specifying an output-permitted user is created on a personal computer (PC), and transmitted to a print server. The print server holds the print job. Then, when a user logs in to one of printing apparatuses after user authentication, a list of print jobs specifying that the user is an output-permitted user is transmitted from the print server to the printing apparatus. When the user selects a print job from the list on the printing apparatus, the selected print job is transferred from the print server to the printing apparatus, to execute printing.

In a printing system assuming printing via a print server, such as ubiquitous printing as described above, the print server collectively manages various kinds of information concerning printing to be performed via the print server, by restricting a printer driver to be installed on each PC only to a printer driver for the print server. At this time, restrictions are generally imposed on, for example, the number of sheets to be printed and color/monochrome.

If the print server goes down under such circumstances, it is impossible to directly transmit a print job from a PC to each printing apparatus. In addition, even if an administrator temporarily permits a local printer driver to be installed on the user's PC to directly transmit a print job from the PC to a printing apparatus when the print server is down, it is not an easy task. This is because the user needs to find and install a local printer driver corresponding to the printing apparatus to which the print job is to be transmitted, and an initial setting (setting of an IP address and others) for making the printer driver available is also required.

Therefore, many methods for solving the above-described problems are disclosed. For example, JP 2012-64004 A discloses the following method. A pull print server acquires, from a printing apparatus, port information for communication with the printing apparatus, and transmits the port information to a PC. The PC stores the transmitted port information. If communication with the pull print server is possible, the PC transmits a print job to the pull print server. If communication is impossible, the PC directly transmits a print job to the printing apparatus by using the stored port information.

[Patent Literature 1] JP 2016-85504 A
[Patent Literature 2] JP 2012-64004 A

However, according to the method described in JP 2012-64004 A, when a print job is directly transmitted from a PC to each printing apparatus, it is impossible to impose restrictions unlike in the case of printing via a print server. Therefore, there is a problem that a user can freely perform printing against the intention of an administrator. In addition, there also arises a problem that the printed details are unknown to the print server.

SUMMARY

The present invention has been made to solve the above-described problems. An object of the present invention is to provide a printing system and a printer driver program capable of imposing restrictions also in the case of directly transmitting a print job to a printing apparatus, similarly to the case of printing via a print server.

To achieve the abovementioned object, according to an aspect of the present invention, a printing system reflecting one aspect of the present invention comprises: a printer driver; a server that receives a print job from an information processor on which the printer driver operates, and transfers the received print job to a printing apparatus; and a printing apparatus that executes the print job received from the server, wherein the server includes: a management part that stores and manages print management information representing print restrictions; and a hardware processor that determines whether to permit printing concerning a print job created by the printer driver, based on the print management information, and the printer driver has functions as: a job creation part that creates a print job; a duplication management part that acquires a duplication of the print management information held by the server, and stores and manages the acquired duplication; a confirmation part that confirms whether the server is available; a print permission confirmation part that requests the server to determine whether to permit printing concerning a print job created by the job creation part if the server is available, and determines whether to permit printing concerning the print job created by the job creation part, by using the duplicate print management information if the server is unavailable; and a direct transmission part that directly transmits the print job to the printing apparatus when the print permission confirmation part determines that printing concerning the print job is permitted.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more various embodiments of the present invention will be described with reference to the drawings. However, the scope of the invention is not limited to the disclosed embodiments.

Figure 1:
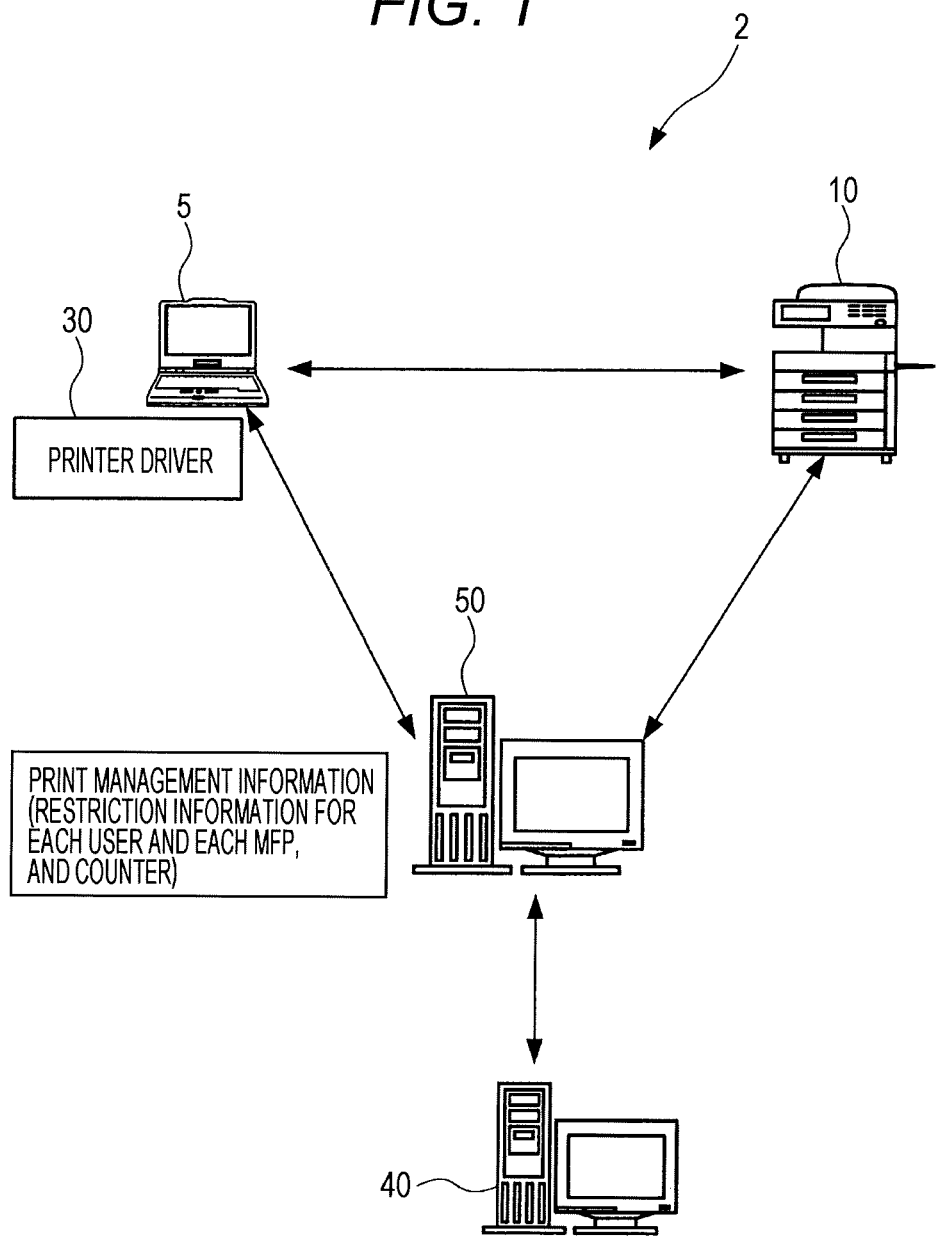
FIG. 1 is a diagram showing a configuration example of a printing system according to an embodiment of the present invention.

FIG. 1 shows a configuration example of a printing system 2 according to an embodiment of the present invention. The printing system 2 includes an information processor such as a personal computer to be used by a user (hereinafter referred to as a PC 5), a multifunction peripheral 10 having a function as a printing apparatus, a print server 50, and an authentication server 40, which are connected via a network. It is possible to include one each of the PC 5 and the multifunction peripheral 10. However, in the embodiment of the present invention, a plurality of the PCs 5 and a plurality of the multifunction peripherals 10 are to be connected.

The PC 5 includes a central processing unit (CPU), a read only memory (ROM), a random access memory (RAM), and the like, and operates based on various programs such as an operating system (OS) and an application program. A printer driver 30, which is a program that functions to, for example, create a print job and transmit the print job to the print server 50, has been installed on the PC 5.

The printer driver 30 also has a function of transmitting a print job to the multifunction peripheral 10 as well as the print server 50. Generally, the printer driver 30 transmits a print job to the print server 50. However, if, for example, the print server 50 is down, the printer driver 30 directly transmits the print job to the multifunction peripheral 10. In the embodiment of the present invention, when a print job is directly transmitted to the multifunction peripheral 10, the print job can be transmitted to a plurality of the multifunction peripherals 10.

The multifunction peripheral 10 is an image forming apparatus having a function of executing various jobs such as a copy job for printing, on a recording paper sheet, an image based on image data obtained by optically reading a document with a scanner, a storage job for storing the image data of the read document as a file or the like, a transmission job for transmitting the image data of the read document as a file or the like to the outside, a print job for printing and outputting an image on a recording paper sheet, based on data of a print job received from the PC 5, and a fax job for transmitting and receiving image data in accordance with a facsimile procedure. Hereinafter, the multifunction peripheral 10 is also referred to as an MFP. It should be noted that a single-function printing apparatus designed only for a print job may be used instead of the multifunction peripheral 10.

In the multifunction peripheral 10, an operation screen to be displayed on an operation panel can be customized for each user. In addition, the multifunction peripheral 10 has a function of authenticating a user. When a user successfully logs in to the multifunction peripheral 10 after user authentication, the multifunction peripheral 10 can display a user's exclusive operation screen customized based on personal panel setting information for the user.

The print server 50 is a server compatible with ubiquitous printing described in the section "Description of the Related art." In the embodiment of the present invention, the print server 50 stores and manages print restriction information representing restrictions on printing, in addition to connection information (IP address, model information, and the like) of each multifunction peripheral 10. Furthermore, the print server 50 determines whether to permit printing concerning a print job (scheduled to be transmitted) created by the PC 5, based on print management information, and prohibits transmission of the print job when it is determined that printing is not permitted.

The print management information includes apparatus-by-apparatus restriction information representing print restrictions for each printing apparatus, and other restriction information representing other print restrictions. The other restriction information includes user-by-user restriction information representing print restrictions for each user. The multifunction peripheral 10 acquires a duplication of apparatus-by-apparatus restriction information concerning the multifunction peripheral 10 from the print server 50, and stores and manages the duplication.

The authentication server 40 is a server for user authentication.

Figure 2:
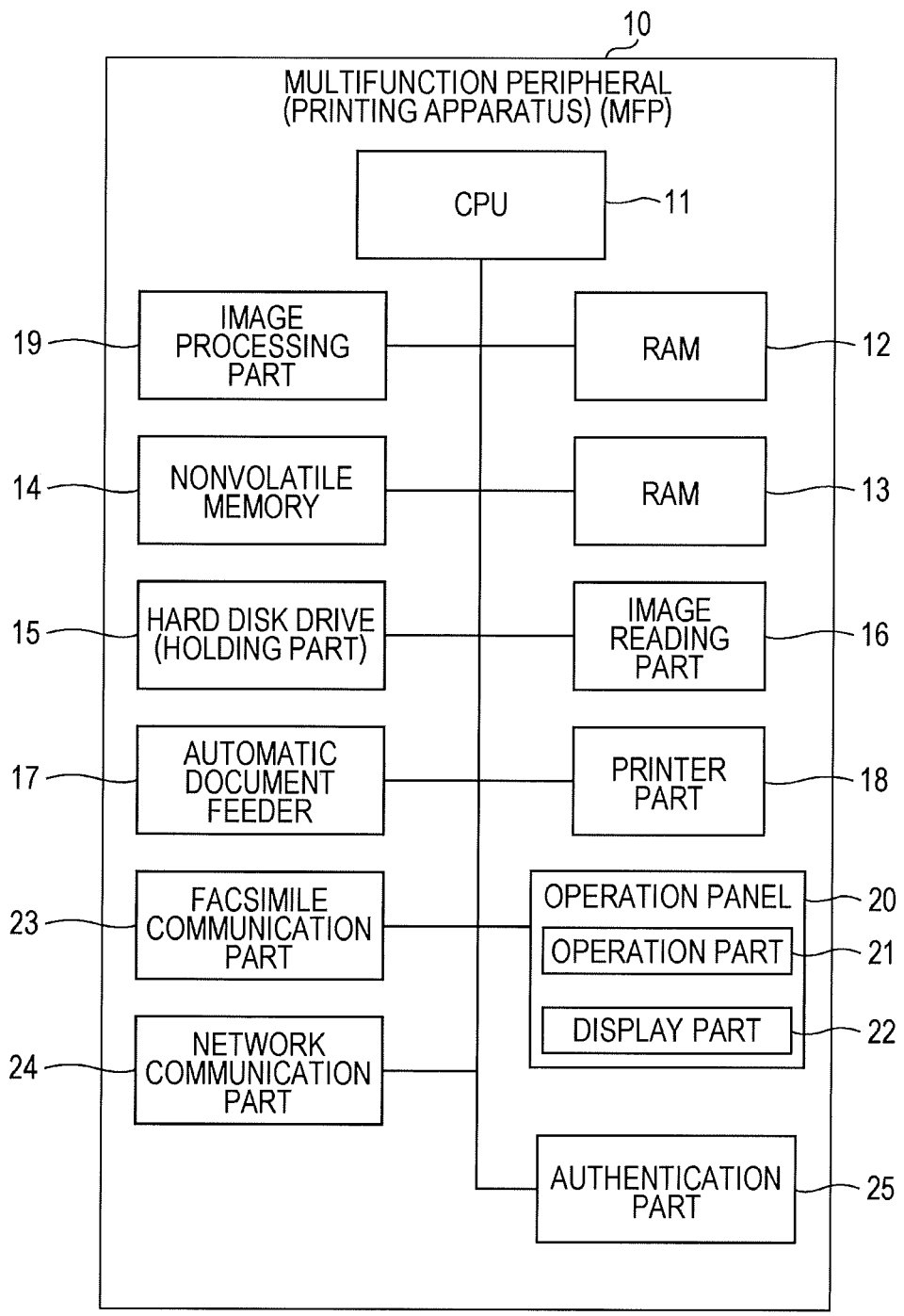
FIG. 2 is a block diagram showing a schematic configuration of a multifunction peripheral.

FIG. 2 is a block diagram showing a schematic configuration of the multifunction peripheral 10. The multifunction peripheral 10 includes a CPU 11 that collectively controls the operation of the multifunction peripheral 10. Via a bus, there are connected to the CPU 11, a ROM 12, a RAM 13, a nonvolatile memory 14, a hard disk drive 15, an image reading part 16, an automatic document feeder (ADF) 17, a printer part 18, an image processing part 19, an operation panel 20, a facsimile communication part 23, a network communication part 24, an authentication part 25, and the like. The operation panel 20 includes an operation part 21 and a display part 22.

The CPU 11 is based on an OS program, and executes middleware, application programs, and the like thereon. The ROM 12 stores various programs. Each function of the multifunction peripheral 10 is implemented by the CPU 11 executing various processing according to the programs.

The RAM 13 is used as, for example, a work memory for temporarily storing various data and an image memory for storing image data when the CPU 11 executes processing based on the programs.

The nonvolatile memory 14 is a memory (flash memory) that enables stored contents to be maintained without being destroyed even when the power is turned off. The nonvolatile memory 14 is used for, for example, storing various setting information.

The hard disk drive 15 is a large-capacity nonvolatile storage device, and functions as a holding part for holding a print job received from the server printer driver 30 of the PC 5. In addition, the hard disk drive 15 stores various programs and data as well as data of print jobs, image data, and the like.

The image reading part 16 functions to optically read a document, and acquire image data thereof. The image reading part 16 includes, for example, a light source, a line image sensor, a moving unit, an optical path, and a conversion part. The light source irradiates a document with light. Upon receiving reflected light, the line image sensor reads one line of the document in its width direction. The moving unit sequentially moves a reading position in units of lines in the length direction of the document. The optical path includes a lens, a mirror, and the like for guiding the reflected light from the document to the line image sensor to form an image. The conversion part converts an analog image signal output from the line image sensor into digital image data.

The automatic document feeder 17 functions to feed and convey a document set on a document placement table, one by one starting from the uppermost sheet, cause the sheets to pass through the reading position of the image reading part 16, and discharge the sheets to a predetermined paper discharge position. The image reading part 16 has a function of reading a document placed on platen glass, and a function of sequentially reading the document conveyed by the automatic document feeder 17.

The printer part 18 functions to form an image on a recording paper sheet according to image data. Here, the printer part 18 is configured as a so-called laser printer that includes a conveying device for conveying recording paper sheets, a photosensitive drum, a charging device, a laser unit, a developing device, a transfer separation device, a cleaning device, and a fixing device, and forms images in the electrophotographic process. Other methods may be used for image formation.

The image processing part 19 performs, for example, rasterization processing for converting print data into image data, and compression and expansion processing of image data, in addition to processing such as enlargement/reduction processing and rotation processing of images.

The operation panel 20 includes an operation part 21 and a display part 22. The display part 22 functions to display various operation screens, and includes a liquid crystal display and the like. The operation part 21 includes various kinds of hard keys such as a start button and a numeric keypad for receiving various operations from a user, and a touch screen provided on a display surface of the display part 22.

The facsimile communication part 23 functions to transmit and receive image data to and from a device having a facsimile function through a telephone line.

The network communication part 24 functions to communicate, via a network, with the PC 5, the print server 50, and various other external devices.

The authentication part 25 functions to authenticate a user. With regard to authentication to be performed by the authentication part 25, it is possible to adopt any authentication method such as authentication based on input of a user ID and a password, detection of an ID card, and vein authentication.

In the embodiment of the present invention, the multifunction peripheral 10 stores and manages management information representing the upper limit of the number of sheets printable in the multifunction peripheral 10, and updates the management information each time a print job is executed.

Figure 3:
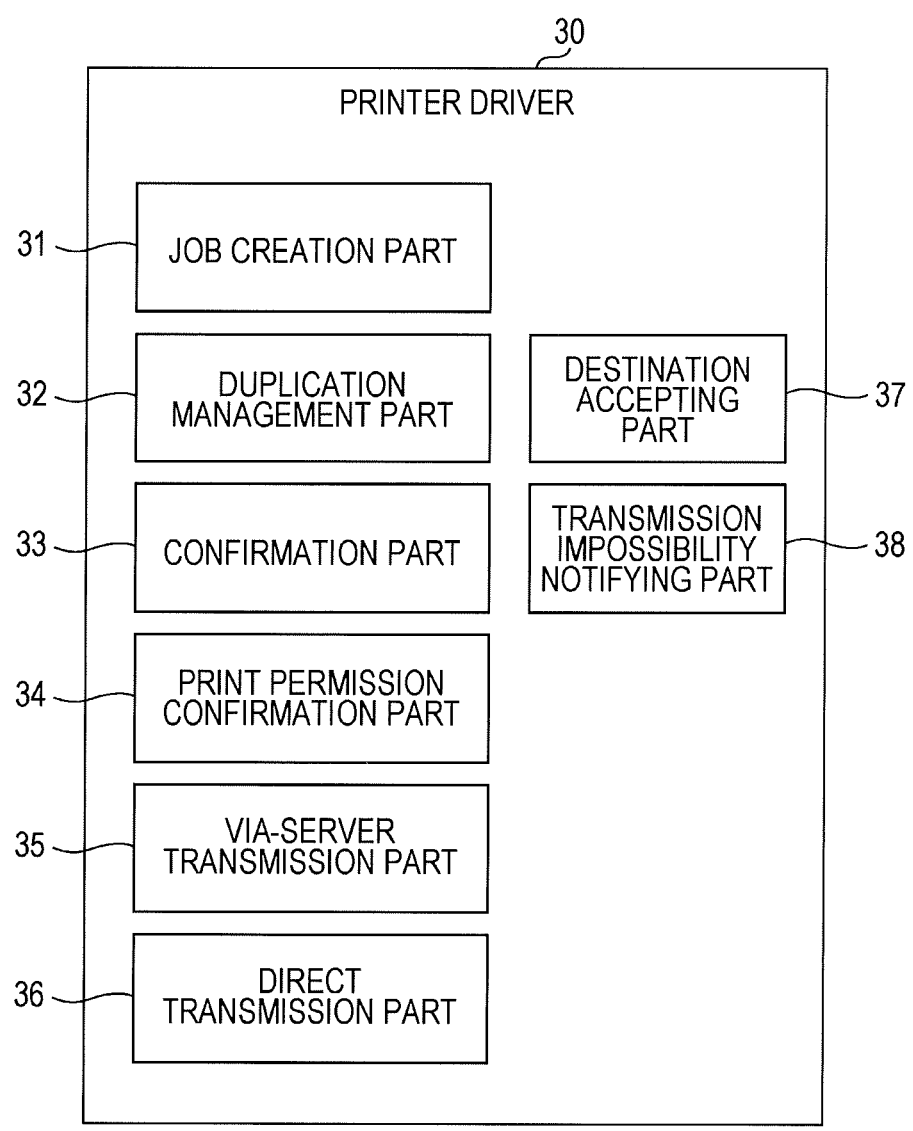
FIG. 3 is a block diagram showing a functional configuration of a printer driver of a PC.

FIG. 3 is a block diagram showing a functional configuration of the printer driver 30. These functions are implemented by the PC 5 executing a printer driver program. The printer driver 30 functions as a job creation part 31, a duplication management part 32, a confirmation part 33, a print permission confirmation part 34, a direct transmission part 36, a via-server transmission part 35, a transmission impossibility notifying part 38, and a destination accepting part 37. The job creation part 31 creates a print job. The duplication management part 32 acquires and holds a duplication of print management information held by the print server 50 (hereinafter referred to as duplicated print management information). The confirmation part 33 confirms whether the print server 50 is available. With respect to the print job created by the job creation part 31, the print permission confirmation part 34 requests the print server 50 to determine whether to permit printing based on the print management information if the print server 50 is available. If the print server 50 is unavailable, the print permission confirmation part 34 performs determination as to whether to permit printing, by using the duplicated print management information held by the duplication management part 32. When the print permission confirmation part 34 determines that printing concerning the print job is permitted, the direct transmission part 36 directly transmits the print job to the multifunction peripheral 10. When the print server 50 determines that printing concerning a print job is permitted, the via-server transmission part 35 transmits the print job to the print server 50. When the print permission confirmation part 34 determines that printing is not permitted, the transmission impossibility notifying part 38 notifies a user of the determination. The destination accepting part 37 accepts a specified destination of the print job.

The job creation part 31 functions to create a print job, upon receiving an instruction from a user.

The duplication management part 32 functions to acquire and hold a duplication of print management information (duplicated print management information) held by the print server 50. When the print server 50 is accessible, and the printer driver 30 is in the idle state in which no processing relating to creation or transmission of a print job is performed, or when a print job is transmitted to the print server 50, the duplication management part 32 acquires print management information from the server, and holds the acquired information as duplicated print management information.

When acquiring new duplicated print management information from the print server 50, the duplication management part 32 updates the duplicated print management information held by itself. Furthermore, when a print job is directly transmitted to the multifunction peripheral 10 for a reason of, for example, the print server 50 being down, the duplication management part 32 updates the duplicated print management information in accordance with the details of the print job. In addition, when the print server 50 recovers later, the duplication management part 32 transmits the updated duplicated print management information (or update details) to the print server 50. The print server 50 updates original print management information held by itself, based on the transmitted information.

The confirmation part 33 functions to determine whether the print server 50 is available. Specifically, the confirmation part 33 makes an inquiry to the print server 50 at the time when a new print job is created or at regular time intervals. Based on a response to the inquiry, the confirmation part 33 determines whether the print server 50 is available. For example, after transmitting an inquiry, if no response to the inquiry is received within a certain period of time, or an answer is received to the effect that the print server 50 is unavailable due to failure or other reasons, the confirmation part 33 determines that the print server 50 is unavailable.

With respect to the print job created by the job creation part 31, if the print server 50 is available, the print permission confirmation part 34 requests the print server 50 to determine whether to permit printing based on the print management information. In addition, if the print server 50 is unavailable, the print permission confirmation part 34 determines whether to permit printing based on other restriction information (user-by-user restriction information) included in the duplicated print management information held by the duplication management part 32, and apparatus-by-apparatus restriction management information stored and managed by the multifunction peripheral 10. The print permission confirmation part 34 makes the above-described determination on the same basis as the print server 50.

It should be noted that the print permission confirmation part 34 functions to narrow down destinations to which a print job is transmitted by the direct transmission part to be described below, based on predetermined selection conditions. The predetermined selection conditions will be described below.

The direct transmission part 36 functions to directly transmit, to the multifunction peripheral 10, a print job permitted by the print permission confirmation part 34 as a result of determination concerning print permission. In this case, the direct transmission part 36 previously acquires connection information of the multifunction peripheral 10 from, for example, the print server 50, and directly transmits a print job to the multifunction peripheral 10 by using the acquired connection information.

The direct transmission part 36 is capable of directly transmitting a print job to a plurality of printing apparatuses, and transmits a print job to a printing apparatus (multifunction peripheral 10) when the print permission confirmation part 34 determines that printing concerning the print job is permitted. The multifunction peripheral 10 holds the print job received from the direct transmission part 36. When a user is authenticated, and a print job of the authenticated user is held, printing concerning the print job of the user becomes possible.

It should be noted that when printing is permitted as a result of determination concerning a print job based on the other restriction information, the direct transmission part 36 transmits the print job to the printing apparatus (multifunction peripheral 10) permitted to perform printing as a result of determination concerning the print job based on the apparatus-by-apparatus restriction information. The direct transmission part 36 does not transmit the print job to the printing apparatus not permitted to perform printing as a result of the determination concerning the print job based on the apparatus-by-apparatus restriction information.

The via-server transmission part 35 functions to transmit, to the print server 50, a print job permitted by the print server 50 as a result of determination concerning print permission.

The destination accepting part 37 functions to accept a destination specified from among destination candidates narrowed down by the print permission confirmation part 34.

It should be noted that here, the printer driver 30 includes a server printer driver and a local printer driver. The server printer driver functions to, for example, create and transmit a print job to the print server 50. The local printer driver directly transmits a print job to each multifunction peripheral 10 individually. The server printer driver has a function of downloading a program of the local printer driver from the Web or the like, installing the program on the server printer driver, and setting up the program to make it available. Generally, the server printer driver transmits a print job to the print server 50. However, for example, if the print server 50 is down, the server printer driver directly transmits the print job to the multifunction peripheral 10 by using the local printer driver downloaded and set up in advance.

The local printer driver installed and set up is under the control of the server printer driver. A user can use the local printer driver only through the server printer driver, and cannot directly use the local printer driver. In addition, the server printer driver can make an addition, change, or deletion of any information, with respect to a print job created by the local printer driver under its control. When receiving, from a user, an instruction to transmit a print job related to security printing or pull printing that requires user authentication on, for example, the multifunction peripheral 10 at the time of output, the server printer driver adds user information and personal panel setting information to the print job created by the local printer driver.

Thus, the server printer driver manages print restrictions by placing the installed local printer driver under its control. The local printer driver fulfills the functions of the job creation part 31 and the direct transmission part 36 at the time of creating a job to be directly transmitted to the multifunction peripheral 10.

For example, the local printer driver is installed in the initialization processing of the server printer driver being installed on the PC 5. In this case, the server printer driver acquires, from the print server 50, information (for example, IP addresses) about all the multifunction peripherals on the network in the initialization processing or the like, and downloads local printer drivers corresponding to the respective multifunction peripherals from the Web. Then, the server printer driver sets up the respective local printer drivers to make them available by using the IP addresses acquired from the print server 50 earlier.

Alternatively, it is possible to adopt the following configuration. When ubiquitous printing to be described below is executed, information (IP address and the like) on the multifunction peripheral 10, which is an output machine of the ubiquitous printing, is transmitted from the print server 50 to the PC 5 that has created a print job of the ubiquitous printing such that the PC 5 sets up a local printer driver corresponding to the multifunction peripheral 10 after installing it from the Web.

Figure 4:
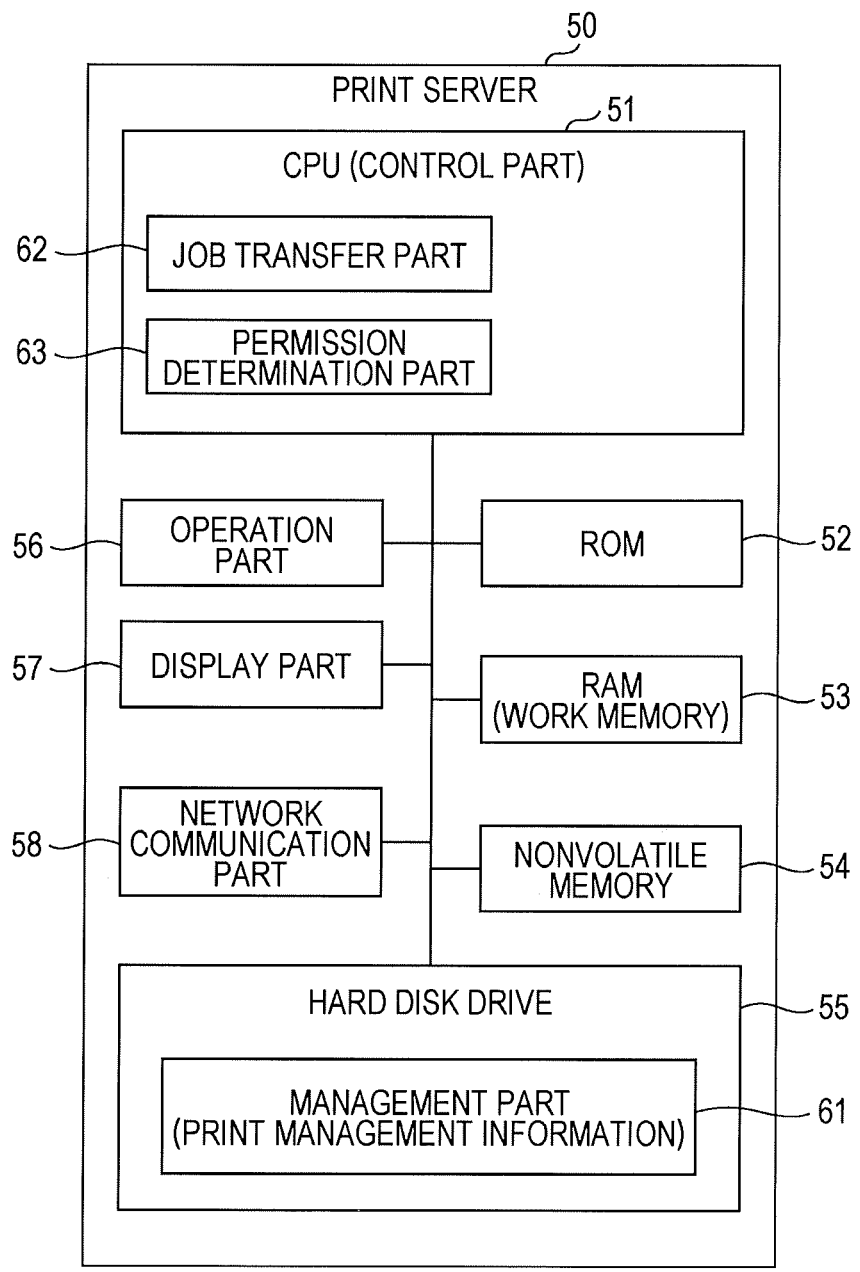
FIG. 4 is a block diagram showing a schematic configuration of a print server.

FIG. 4 is a block diagram showing a schematic configuration of the print server 50. The print server 50 includes a CPU 51 as a control part for collectively controlling the operation of the print server 50. Via a bus, there are connected to the CPU 51, a ROM 52, a RAM 53, a nonvolatile memory 54, a hard disk drive 55, an operation part 56, a display part 57, a network communication part 58, and the like.

The CPU 51 is based on an OS program, and executes middleware, application programs, and the like thereon. The ROM 52 stores various programs. Each function of the print server 50 is implemented by the CPU 51 executing various processing according to the programs.

The RAM 53 is used as, for example, a work memory for temporarily storing various data when the CPU 51 executes processing based on the programs.

The nonvolatile memory 54 is a memory (flash memory) that enables stored contents to be maintained without being destroyed even when the power is turned off. The nonvolatile memory 54 is used for, for example, storing various setting information.

The hard disk drive 55 is a large-capacity nonvolatile storage device, and stores various programs and data. Here, the hard disk drive 55 stores, for example, a print job received from the PC 5, the above-described connection information (IP address, model information, and the like) of each MFP, and information on driver setting. Furthermore, in the embodiment of the present invention, the hard disk drive 55 functions as a management part 61 that stores the above-described print management information and the like.

The print management information includes a user's job history, user-specified panel setting (personal panel information), billing information, and the like in addition to the above-described apparatus-by-apparatus restriction information and other restriction information (user-by-user restriction information).

The display part 57 functions to display various operation screens, setting screens, and the like. The display part 57 includes a liquid crystal display and the like. The operation part 56 functions to receive various operations from a user. The network communication part 58 functions to communicate, via a network, with the PC 5, the multifunction peripheral 10, and various other external devices.

The CPU 51 functions as a job transfer part 62 and a permission determination part 63. The job transfer part 62 transmits corresponding one of print jobs held in the hard disk drive 55 to the multifunction peripheral 10 from which the transfer request thereof has been transmitted. The permission determination part 63 determines whether to permit printing concerning a print job created by the PC 5, based on the print management information.

Additionally, in the embodiment of the present invention, the CPU 51 reads, from the hard disk drive 55, the personal panel setting information of a user authenticated by the multifunction peripheral 10, and transmits the information to the multifunction peripheral 10.

Figure 5:
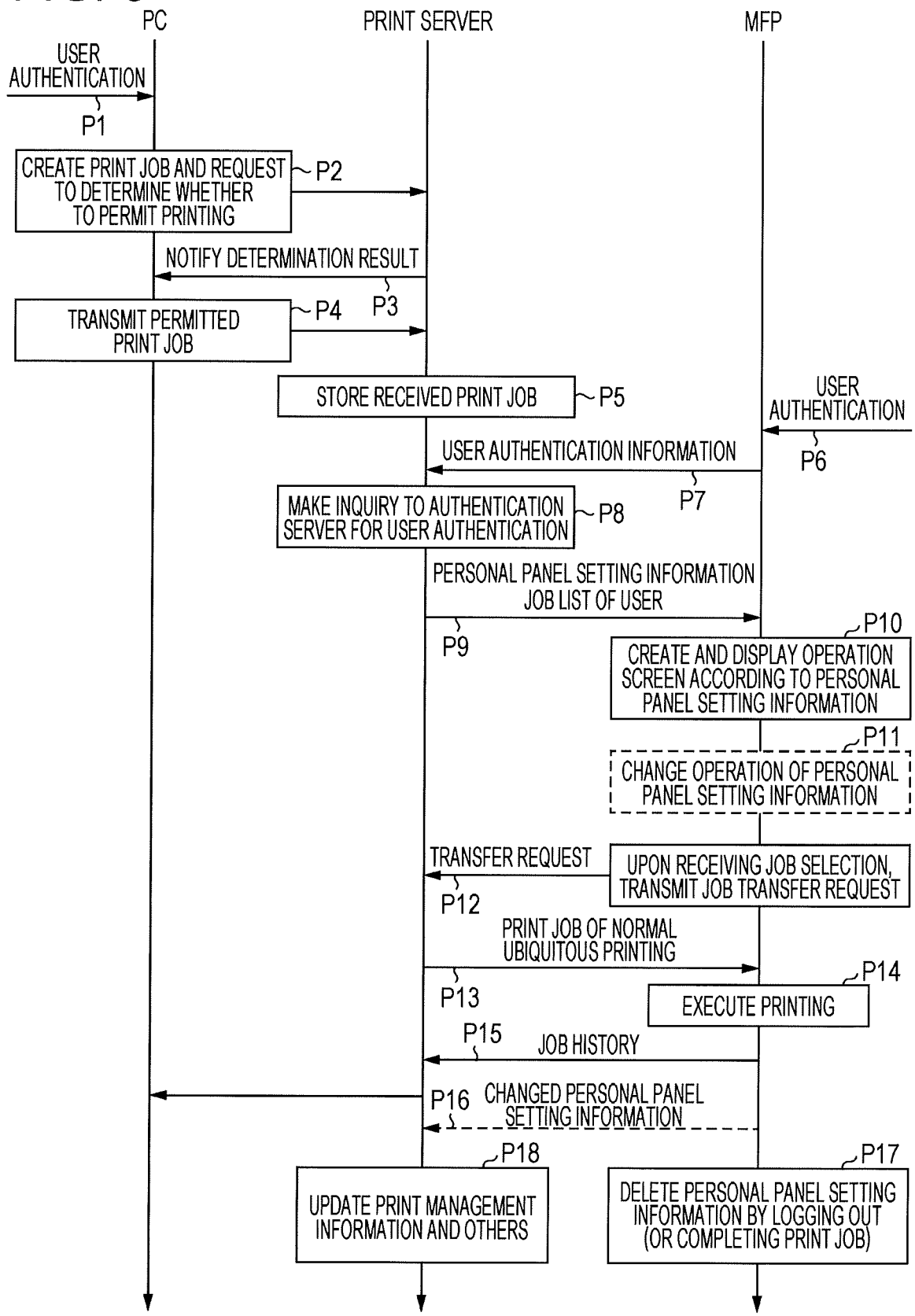
FIG. 5 is a diagram showing a print sequence at the time when the print server is normally operating.

FIG. 5 describes a print sequence in the printing system 2 at the time when the print server 50 is normally operating. It should be noted that each PC 5 is to be dedicated for a single user's use. Upon receiving user authentication (P1) and further receiving, from the user, an instruction to transmit a print job relating to security printing or pull printing that requires user authentication on, for example, the multifunction peripheral 10 at the time of output, the PC 5 creates the print job with user information of the user added thereto, and also confirms whether the print server 50 is normally operating. When the print server 50 is normally operating, the PC 5 requests the print server 50 to determine whether to permit printing concerning the print job (P2).

The print server 50 determines whether to permit printing concerning the print job based on the print management information held by the print server 50, and notifies the printer driver 30 of the determination result (P3). When receiving notification to the effect that printing is not permitted, the printer driver 30 notifies the user to that effect, and urges the user to reset printing conditions of the print job. When receiving notification of print permission, the printer driver 30 transmits the print job to the print server 50 (P4).

Upon receiving the above-described print job, the print server 50 holds the received print job in, for example, a folder for the user (P5). Subsequently, when the user enters user authentication information for user authentication in any one of the multifunction peripherals 10 (P6), the multifunction peripheral 10 transmits the entered user authentication information to the print server 50 (P7). The print server 50 transmits the received user authentication information to the authentication server 40 to request user authentication (P8).

Upon receiving a response from the authentication server 40 to the effect that the user has been successfully authenticated, the print server 50 reads, from the hard disk drive 55, personal panel setting information of the successfully authenticated user (referred to as a login user) related to the multifunction peripheral 10 from which the user authentication information has been transmitted, and transmits the personal panel setting information and a list of print jobs stored in the folder of the login user, to the multifunction peripheral 10 from which the user authentication information has been transmitted (P9).

Upon receiving the information and the list, the multifunction peripheral 10 temporarily stores the received personal panel setting information, and also customizes and displays the operation screen according to the personal panel setting information (P10). Furthermore, when receiving a change operation of the personal panel setting information from the login user, the multifunction peripheral 10 changes the temporarily stored personal panel setting information according to the change operation, and also changes the operation screen being displayed (P11).

Then, the multifunction peripheral 10 displays the list of print jobs received from the print server 50. Upon receiving, from the user, notification of a selected print job and a print instruction, the multifunction peripheral 10 transmits a transfer request of the selected print job to the print server 50 (P12). Upon receiving the transfer request, the print server 50 transmits data of the print job requested by the transfer request to the multifunction peripheral 10 that has requested the transfer (P13).

Upon receiving the print job, the multifunction peripheral 10 executes printing (P14). Subsequently, the multifunction peripheral 10 transmits an execution result and the like of the print job (job history) to the print server 50 (P15). In addition, when receiving a change operation of the personal panel setting information, the multifunction peripheral 10 transmits, to the print server 50, the changed personal panel setting information (in this case, the changed portion only), user information of the login user, and information (model and the like) on the multifunction peripheral 10 (P16). When the user logs out (when the execution of the print job is completed), the multifunction peripheral 10 deletes, from itself, the personal panel setting information of the user who has logged out (P17).

Based on the job history received from the multifunction peripheral 10, the print server 50 updates the print management information held by itself, which includes, for example, the job history and the counter of restriction information (P18). Furthermore, when receiving personal panel setting information from the multifunction peripheral 10, the print server 50 updates the personal panel setting information corresponding to both of the multifunction peripheral 10 and the user specified in the received user information, by using the changed personal panel setting information which has been received.

It should be noted that the printing performed via the print server 50 in the print sequence as described above is to be referred to as normal ubiquitous printing. As described above, when the print server 50 is functioning, normal ubiquitous printing is performed, and each multifunction peripheral 10 displays the operation screen customized based on the personal panel setting information received from the print server 50. Moreover, when the print server 50 is functioning, the print server 50 manages print restrictions in a centralized manner.

Next, processing corresponding to the case of the print server 50 being down will be described.

Figure 6:
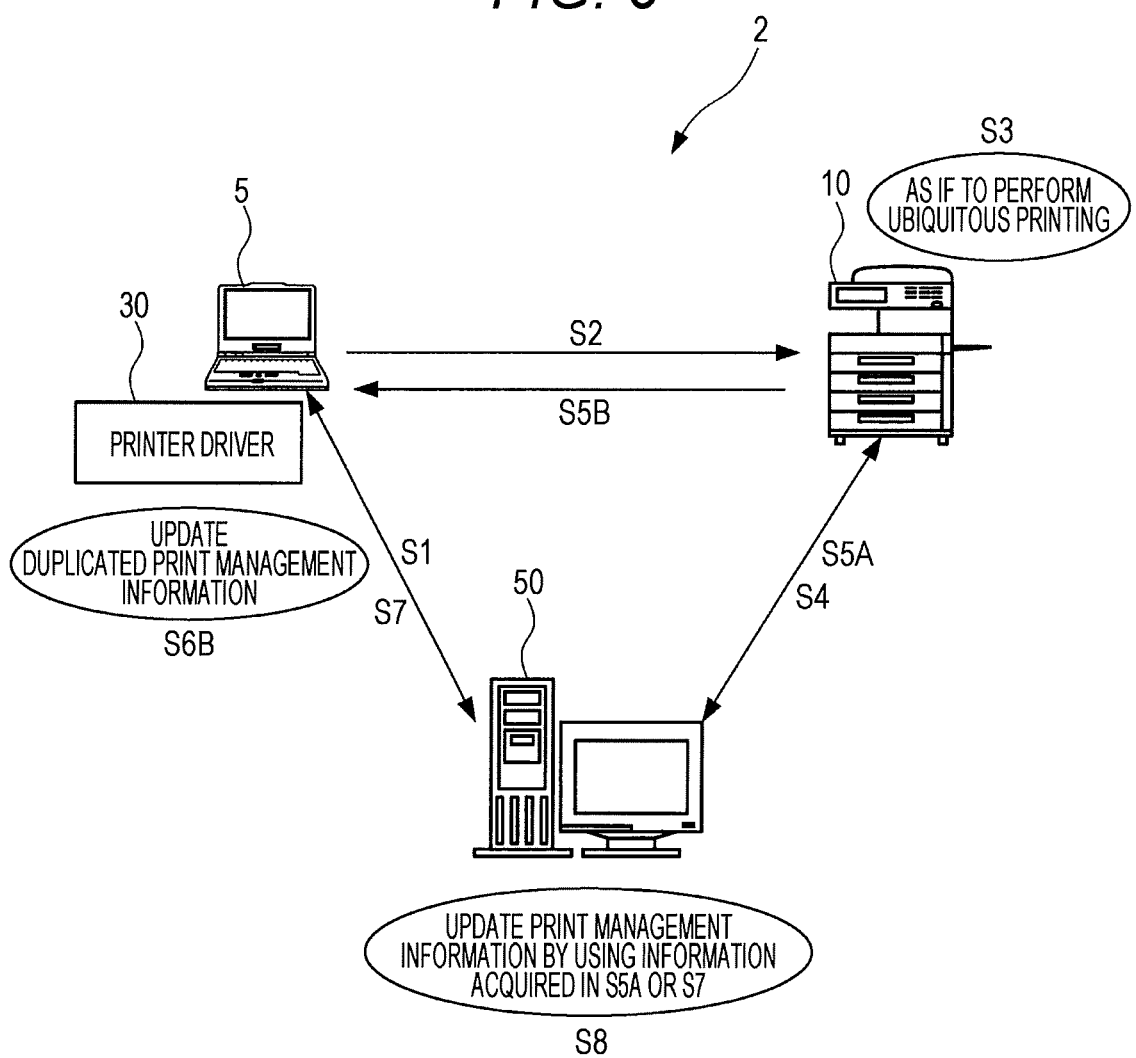
FIG. 6 is a diagram showing a print sequence at the time when the print server is down.

FIG. 6 shows the manner in which the PC 5 transmits a print job to the multifunction peripheral 10 when the print server 50 is down.

Upon receiving a print instruction from a user, the printer driver 30 of the PC 5 checks whether the print server 50 is available, based on a communication state. When communication is impossible and the print server 50 is thus determined to be unavailable (down) (or when an instruction for performing direct printing without involving the print server 50 is received from the user) (S1), the printer driver 30 transfers management authority regarding, for example, restriction on the number of sheets to be printed, from the print server 50 to the printer driver 30, and switches its own operation mode to the non-via-server mode. Then, the printer driver 30 checks whether printing is possible based on the print restrictions. If printing is possible, the printer driver 30 directly transmits the print job to the corresponding multifunction peripheral 10 (S2).

Specifically, in the non-via-server mode, the PC 5 determines whether to permit printing concerning the created print job, based on the duplicated print management information held by the duplication management part 32. Here, based on the other restriction information (user-by-user restriction information) in the duplicated print management information, the PC 5 determines whether to permit printing concerning the print job based on the print restrictions for the user who has created the print job (the user who has logged in to the PC 5), and also determines whether to permit printing for each multifunction peripheral 10 based on the apparatus-by-apparatus restriction information.

When it is determined that printing is not permitted based on the user-by-user restriction information, the print job is not transmitted to any multifunction peripheral 10. When it is determined that printing is permitted based on the user-by-user restriction information, the print job is transmitted only to the multifunction peripheral 10 permitted to perform printing as a result of the determination based on the apparatus-by-apparatus restriction information.

For example, the printer driver 30 of the PC 5 primarily determines that printing is permitted when a print job does not conflict with restrictions, such as the upper limit of the number of sheets to be printed and a color restriction (color/monochrome), specified in the user-by-user restriction information of the login user. Furthermore, the printer driver 30 of the PC 5 determines whether to permit printing concerning the print job, in accordance with the apparatus-by-apparatus restriction information of each multifunction peripheral 10 (secondary determination). For example, the printer driver 30 of the PC 5 determines whether the print job conflicts with the upper limit of the number of sheets to be printed for each multifunction peripheral 10. Then, the printer driver 30 of the PC 5 directly transmits the print job permitted as a result of the primary determination, to the multifunction peripheral 10 permitted to print as a result of the secondary determination. At this time, the personal panel setting information and the user information are added to the print job. In the case where a print job cannot be transmitted to any multifunction peripheral 10, specifically, in the case where printing concerning the print job is not permitted as a result of the primary determination, or in the case where printing is permitted as a result of the primary determination, but none of the multifunction peripherals 10 is permitted to print as a result of the secondary determination, the printer driver 30 of the PC 5 notifies the user to that effect, and urges the user to reset print details.

It should be noted that a print job may be transmitted to one or all of a plurality of the multifunction peripherals 10 permitted to print as a result of the determination based on the apparatus-by-apparatus restriction information. Alternatively, a destination of the print job may be selected from among the multifunction peripherals 10 permitted to print, by further narrowing them down based on the predetermined selection conditions. For example, a print job may be transmitted only to the multifunction peripheral 10 selected by the user from among the multifunction peripherals 10 permitted to print as a result of the secondary determination based on the apparatus-by-apparatus restriction information. Alternatively, in consideration of a usage history and the like, an apparatus used at more than a specific usage frequency or the last apparatus used may be selected as a destination of the print job. The predetermined selection conditions are not limited thereto.

The printer driver 30 of the PC 5 may determine (secondarily determine) whether to permit printing based on the apparatus-by-apparatus restriction information, as described above. Alternatively, each multifunction peripheral 10 may determine whether printing is possible, and return the determination result to the PC 5. In the latter case, each multifunction peripheral 10 uses apparatus-by-apparatus restriction information held by itself.

The multifunction peripheral 10 executes the print job received from the PC 5 (S3). When transmitting a print job, the printer driver 30 of the PC 5 imposes restrictions on the print details based on the duplicated print management information. Accordingly, in the operations of S1 to S3, it is possible to impose print restrictions similar to those in the case of performing ubiquitous printing.

Next, the multifunction peripheral 10 confirms whether the print server 50 has recovered from a down state (S4). In the case of the print server 50 having recovered, the multifunction peripheral 10 transmits the job history of the print job executed in S3, to the print server 50 (S5A). In the case of the print server 50 having not recovered, the multifunction peripheral 10 transmits the job history to the PC 5 (S5B).

The PC 5 updates the duplicated print management information, based on the job history received from the multifunction peripheral 10 in S5B (S6B). Subsequently, the PC 5 confirms whether the print server 50 has recovered from the down state. When it is confirmed that the print server 50 has recovered, the PC 5 transmits the duplicated print management information updated in S6B, to the print server 50 (S7).

When receiving the job history in S5A, the print server 50 having recovered from the down state updates the print management information held by itself, based on the job history. When receiving the duplicated print management information in S7, the print server 50 updates the print management information held by itself, based on the duplicated print management information (S8).

The processing of S1 to S8 described in FIG. 6 constitutes a basic processing flow at the time when the PC 5 directly transmits a print job to the multifunction peripheral 10 in the case of the print server 50 being down. It should be noted that the flow of processing in which the PC 5 transmits the duplicated print management information to the print server 50, and the flow of processing in which the multifunction peripheral 10 transmits the job history to the print server 50 are not limited to that described in FIG. 6. Examples of other processing flows will be described below.

Figure 7:
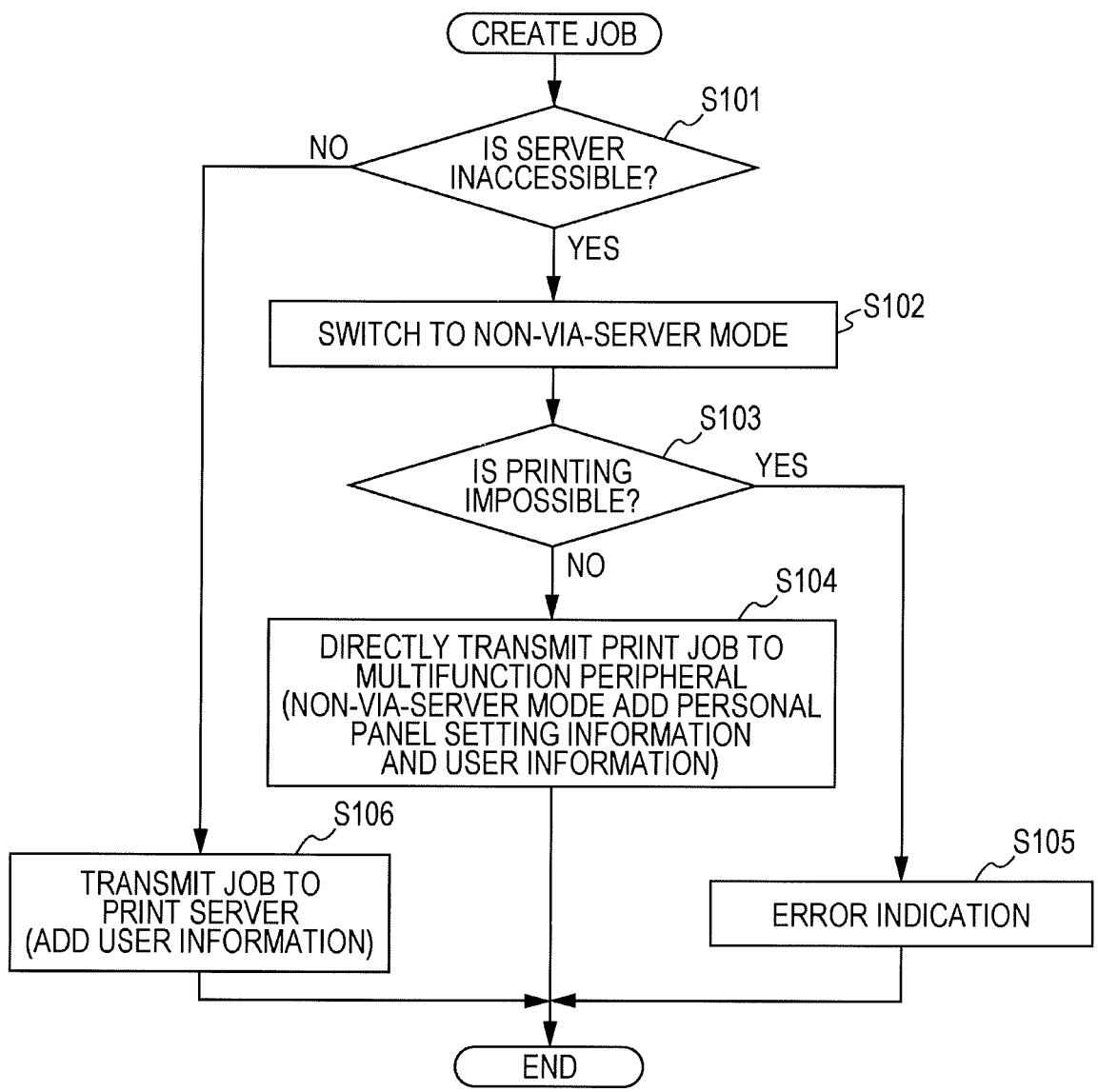
FIG. 7 is a flowchart showing processing at the time when the printer driver transmits a print job.

FIG. 7 is a flowchart showing processing to be performed by the printer driver 30 in the PC 5. Upon receiving, from a user, an instruction to create and transmit a print job, the printer driver 30 of the PC 5 checks whether the print server 50 is available, based on a communication state (step S101). If the print server 50 is accessible (step S101; No), the printer driver 30 creates a print job of normal ubiquitous printing (with user information added thereto and no personal panel setting information added thereto), and transmits the print job to the print server 50 (step S106) to terminate the processing.

If the print server 50 is inaccessible (step S101; Yes), the printer driver 30 switches the mode to the non-via-server mode (step S102) in which the printer driver 30 determines whether printing concerning a print job is permitted. Then, the printer driver 30 determines whether printing concerning the present print job is permitted, based on the duplicated print management information held by the duplication management part 32 (step S103). Here, as described above, based on the other restriction information (user-by-user restriction information) in the duplicated print management information, the printer driver 30 determines whether to permit printing concerning the print job based on the print restrictions for the user who has created the print job (the user who has logged in to the PC 5), and also determines whether to permit printing for each multifunction peripheral 10 based on the apparatus-by-apparatus restriction information.

If printing is not permitted as a result of the determination concerning print permission based on the other restriction information, or if none of the multifunction peripherals 10 is permitted to print as a result of the determination concerning print permission for each multifunction peripheral 10 based on the apparatus-by-apparatus restriction information (step S103; Yes), it is determined that printing is impossible, and an error indication is provided (step S105) to terminate the processing.

If printing is permitted as a result of the determination concerning print permission based on the other restriction information, and one or more multifunction peripherals 10 are permitted to print as a result of the determination concerning print permission for each multifunction peripheral 10 based on the apparatus-by-apparatus restriction information (step S103; No), it is determined that printing is possible. Accordingly, the user information and the personal panel setting information of the user who has logged in to the PC 5 are added to the print job, and the print job is transmitted to the one or more multifunction peripherals 10 permitted to print (step S104) to terminate the processing.

It should be noted that when step S105 is executed, the non-via-server mode is released immediately after the execution of step S105. When step S104 is executed, the non-via-server mode is released in the case where notification of execution of the print job (job history or the like) is received, or in the case of "No" in step S101 of the next processing.

Figure 8:
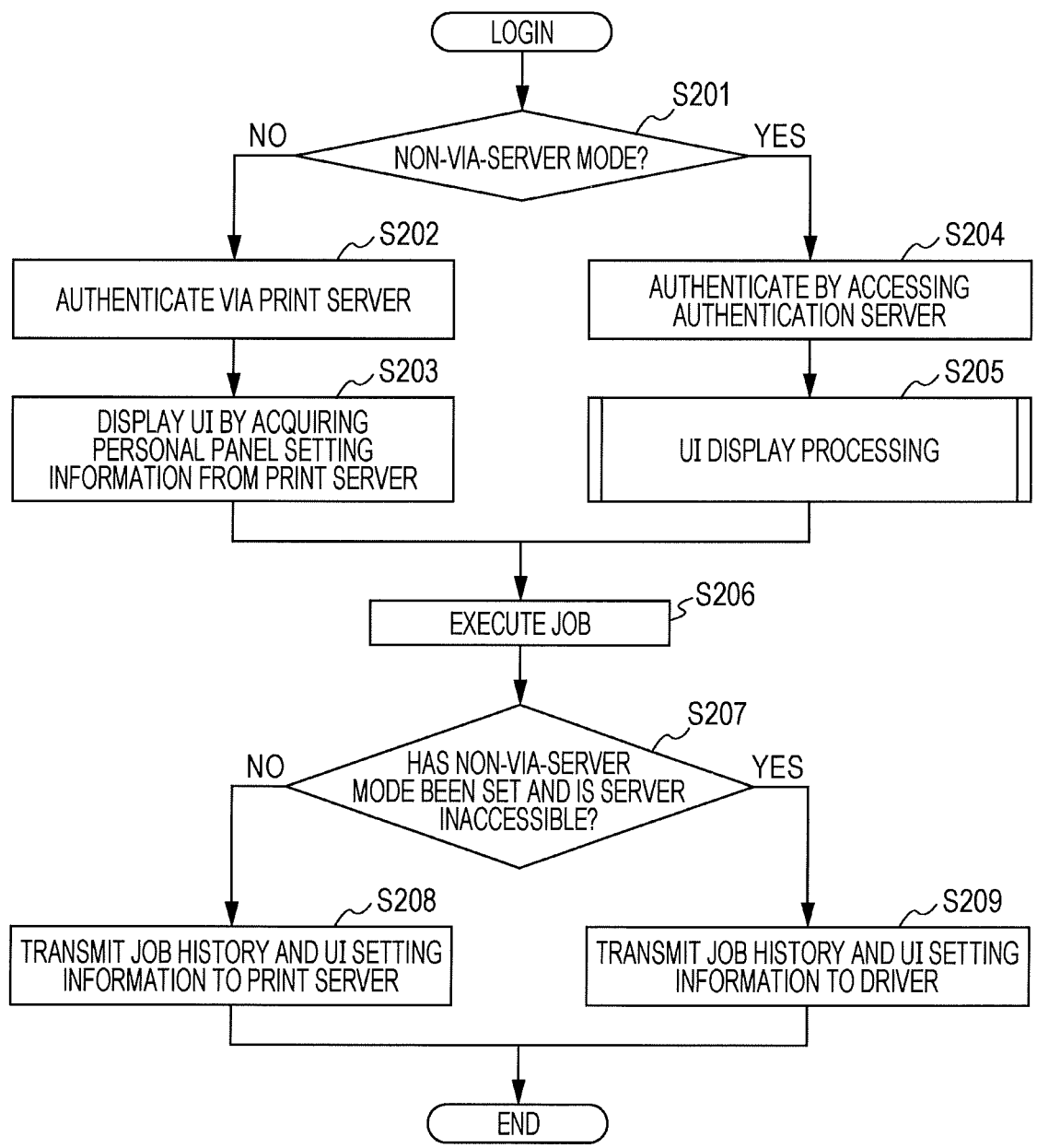
FIG. 8 is a flowchart showing processing of determining whether printing concerning a print job can be executed, and processing of transmitting the print job.

FIG. 8 is a flowchart showing processing to be performed by the multifunction peripheral 10 when a user logs in. When a user logs in, the multifunction peripheral 10 first checks whether the flag of the non-via-server mode has been set (step S201). If the flag of the non-via-server mode has not been set (step S201; No), user authentication is performed by the authentication server 40 via the print server 50 (step S202). When the user is successfully authenticated, the multifunction peripheral 10 acquires personal panel setting information from the print server 50, and displays the operation screen (UI), the setting of which has been changed in accordance with the personal panel setting information (step S203). Then, the process proceeds to step S206.

If the flag of the non-via-server mode has been set (step S201; Yes), the multifunction peripheral 10 directly accesses the authentication server 40 to perform user authentication (step S204). Upon successful authentication, the multifunction peripheral 10 displays the operation screen (UI), the setting of which has been changed by using the personal panel setting information of the login user (step S205). Then, the process proceeds to step S206.

Subsequently, the multifunction peripheral 10 executes a print job selected from a job list (step S206). When the execution of the print job is completed, the multifunction peripheral 10 determines whether the non-via-server mode has been set, and the print server 50 is currently inaccessible (step S207).

If the non-via-server mode has been set, and the print server 50 is inaccessible (step S207; Yes), the multifunction peripheral 10 transmits the job history (execution result of the job) and the personal panel setting information (changed portion only) to the printer driver 30 from which the executed print job has been transmitted (step S209) to terminate the processing.

In the opposite case, that is, if the non-via-server mode has not been set, or the print server 50 is accessible (step S207; No), the multifunction peripheral 10 transmits the job history and the personal panel setting information to the print server 50 (step S208) to terminate the processing.

Figure 9:
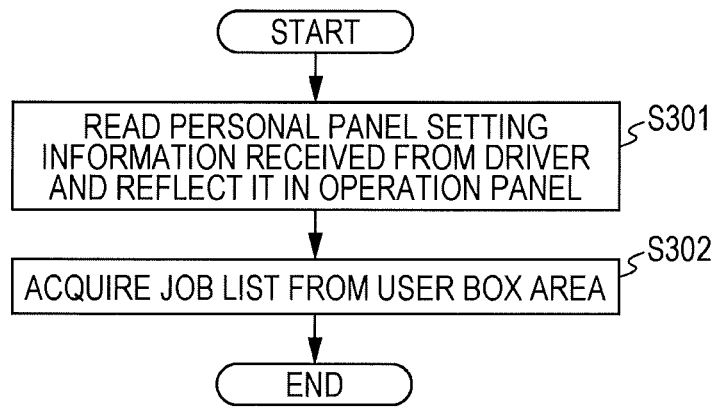
FIG. 9 is a flowchart showing processing in the case of causing the multifunction peripheral to display a print job.

FIG. 9 shows details of step S205 shown in FIG. 8. The multifunction peripheral 10 reads the personal panel setting information of the login user, received and held together with the print job transmitted from the printer driver 30 of the PC 5. Then, the multifunction peripheral 10 displays the operation screen (UI), the setting of which has been changed in accordance with the read information (step S301). Furthermore, when displaying the job list, the multifunction peripheral 10 creates and displays a list of print jobs stored in an authentication print box of the login user (step S302).

Next, determination concerning print permission for each multifunction peripheral 10 to be performed based on the apparatus-by-apparatus restriction information at the time when a print job is transmitted in the non-via-server mode, will be described with specific examples.

Figure 10:
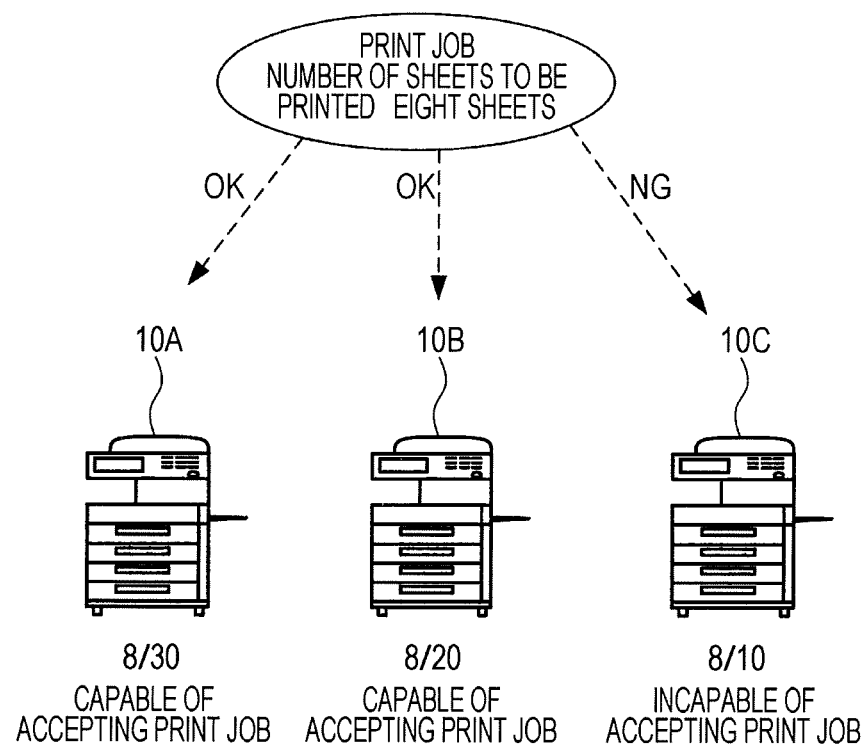
FIG. 10 is a diagram showing a manner of determining whether printing concerning a created print job can be executed for each multifunction peripheral.

FIG. 10 shows an example of determining whether to permit printing concerning a print job created by the printer driver 30, for each multifunction peripheral 10, based on the apparatus-by-apparatus restriction information, in the case of the three multifunction peripherals 10 (referred to as multifunction peripherals 10A to 10C).

In FIG. 10, the apparatus-by-apparatus restriction information specifies the cumulative number of printed sheets and the upper limit of the number of sheets to be printed for each multifunction peripheral 10, as follows.

(Cumulative number of printed sheets/upper limit of number of sheets to be printed)
  Multifunction peripheral 10A (8/30)
  Multifunction peripheral 10B (8/20)
  Multifunction peripheral 10C (8/10)

Eight sheets are to be printed for the print job created by the printer driver 30. Accordingly, the multifunction peripherals 10A and 10B are determined to be capable of accepting the print job. Meanwhile, the multifunction peripheral 10C is determined to be incapable of accepting the print job.

In the non-via-server mode, as described above, the print job is to be transmitted to the multifunction peripheral 10 determined to be capable of accepting the created print job (capable of printing). It is possible to select the destination of the print job by further narrowing down the multifunction peripherals 10 determined to be capable of printing, based on the usage history and the like.

Next, the operation of the printing system 2 for maintaining the integrity of print management information of the print server 50 having recovered from the down state will be described.

First, processing to be performed by the multifunction peripheral 10 will be described. Upon completion of the execution of the print job transmitted in the non-via-server mode, the multifunction peripheral 10 updates the apparatus-by-apparatus print information held by itself. If the print server 50 has recovered from the down state, that is, if it is possible to communicate with the print server 50, at the time of completion of the update, the multifunction peripheral 10 transmits, to the print server 50, the job history of the print job and UI setting information (or the updated apparatus-by-apparatus print information held by the multifunction peripheral 10), as described in step S208 of FIG. 8.

If the print server 50 has not recovered at the time of completion of the execution of the print job transmitted in the non-via-server mode, the multifunction peripheral 10 transmits, to the PC 5, the job history, the UI setting information, and the like (or the updated apparatus-by-apparatus print information held by the multifunction peripheral 10).

When the printer driver 30 of the PC 5 transmits the print job in the non-via-server mode, the printer driver 30 updates the duplicated print management information held by itself, based on the details of the transmitted print job. Subsequently, when receiving the job history, the UI setting information, and the like (or the updated apparatus-by-apparatus print information held by the multifunction peripheral 10) from the multifunction peripheral 10, the printer driver 30 confirms, based thereon, whether the above-described update details are correct.

For example, if the multifunction peripheral 10 fails in printing, details specified in the job history differ from details specified in the duplicated print management information. Therefore, if the details specified in the job history are different from the details specified in the duplicated print management information, the duplicated print management information is corrected and updated based on the details specified in the job history. If the details specified in the job history agree with the details specified in the duplicated print management information, it is determined that the duplicated print management information has been correctly updated.

Upon recovery from the down state, the print server 50 inquires of the multifunction peripheral 10 whether there are the job history of the print job executed in the non-via-server mode and the UI setting information (it may be the updated apparatus-by-apparatus print information). If there are, the print server 50 acquires them. In addition, the print server 50 acquires the duplicated print management information from the PC 5.

The print server 50 updates the print management information held by itself, based on both of the job history and the UI setting information (or the updated apparatus-by-apparatus print information) acquired from the multifunction peripheral 10, and the duplicated print management information acquired from the PC 5. With regard to overlap between the details specified in the job history, the UI setting information, and the duplicated print management information, the print server 50 performs the update while prioritizing the detail of the latest date (time). In this manner, the print server 50 updates the print management information by merging and combining information included in the job history, the UI setting information, and the duplicated print management information.

As a variation, it is also possible to adopt the following configuration. Updated duplicated print management information corresponding to the transmission of a print job in the non-via-server mode is transmitted to the multifunction peripheral 10. Then, the multifunction peripheral 10 transmits, to the print server 50 having recovered, the updated duplicated print management information together with a job history and UI setting information. In the present variation, even when the PC 5 shifts to the power-off state before the print server 50 recovers, the print server 50 can correctly update the print management information held by itself, by acquiring the above-described information from the multifunction peripheral 10.

Moreover, it is also possible to adopt the following configuration. Instead of determining based on an inquiry from the print server 50 having recovered, the PC 5 or the multifunction peripheral 10 monitors whether the print server 50 has recovered, by repeatedly attempting to access it. When access thereto becomes possible, the PC 5 or the multifunction peripheral 10 determines that the print server 50 has recovered, and transmits, to the print server 50, the duplicated print management information, the job history, and the UI setting information (or the updated apparatus-by-apparatus print information).

As described above, in the printing system 2 according to the present invention, even when the print server 50 is down, the printer driver 30 of the PC 5 can directly transmit a print job to the multifunction peripheral 10 by switching to the non-via-server mode. In addition, even when a print job is transmitted in the non-via-server mode, it is possible to impose restrictions similar to those in the case of transmitting a print job via the print server 50.

Furthermore, even when printing is performed in the non-via-server mode, the print server 50 can correctly update the print management information held by itself, by acquiring the details of the printing from the multifunction peripheral 10 or the PC 5, and providing feedback.

Although embodiments of the present invention have been described and illustrated in detail, the disclosed embodiments are made for purposes of illustration and example only and not limitation. The scope of the present invention should be interpreted by terms of the appended claims. Changes and additions made without departing from the scope of the invention are to be included in the present invention.

The print server 50 set forth in the embodiment is not limited to a ubiquitous server, but may be a print server other than the ubiquitous server.

The embodiment includes the multifunction peripheral 10. However, an apparatus having at least a printing function, such as a single-function printing apparatus, may be used instead of the multifunction peripheral 10.

In the embodiment of the present invention, a print job is transmitted only to a printing apparatus determined to be capable of printing, in the non-via-server mode. However, it is also possible to transmit a print job to all printing apparatuses capable of communication.

What is claimed is:
1. A printing system comprising:
a printer driver;
a server that receives a print job from an information processor on which the printer driver operates, and transfers the received print job to a printing apparatus; and
a printing apparatus that executes the received print job received from the server,
wherein the server includes:
a management part that stores and manages print management information representing print restrictions; and
a hardware processor that determines whether to permit printing concerning a print job created by the printer driver, based on the print management information, and the printer driver has functions as:
a job creation part that creates a print job;
a duplication management part that acquires a duplication of the print management information held by the server, and stores and manages the acquired duplication;
a confirmation part that confirms whether the server is available;
a print permission confirmation part that requests the server to determine whether to permit printing concerning the print job created by the job creation part if the server is available, and determines whether to permit printing concerning the print job created by the job creation part, by using the duplicate print management information if the server is unavailable; and
a direct transmission part that directly transmits the print job created by the job creation part to the printing apparatus when the print permission confirmation part determines that printing concerning the print job created by the job creation part is permitted;
wherein:
the printing apparatus acquires, from the server, a duplication of apparatus-by-apparatus restriction information on the printing apparatus, and stores and manages the acquired duplication, and
the print permission confirmation part determines whether to permit printing based on user-by-user restriction information stored and managed by the duplication management part and the apparatus-by-apparatus restriction information stored and managed by the printing apparatus when the server is unavailable.

2. The printing system according to claim 1, wherein
the direct transmission part of the printer driver is capable of directly transmitting the print job to a plurality of printing apparatuses,
the direct transmission part transmits the print job to the plurality of printing apparatuses when the print permission confirmation part determines that printing concerning the print job is permitted, and
the printing apparatus holds the print job received from the direct transmission part such that upon a user being authenticated, if a print job of the authenticated user is held, printing concerning the print job of the user becomes possible.

3. The printing system according to claim 2, wherein
the printer driver selects some of the plurality of printing apparatuses as a destination to which the direct transmission part transmits the print job, based on predetermined selection conditions.

4. The printing system according to claim 2, wherein
the print management information includes apparatus-by-apparatus restriction information representing print restrictions for each printing apparatus, and other restriction information representing other print restrictions,
the print permission confirmation part performs determination concerning print permission based on the other restriction information, and also performs determination concerning print permission based on the apparatus-by-apparatus restriction information, and
the direct transmission part transmits the print job to a printing apparatus permitted to print as a result of determination concerning print permission for the print job based on the apparatus-by-apparatus restriction information, and transmits the print job to no printing apparatus not permitted to print as a result of the determination concerning print permission for the print job based on the apparatus-by-apparatus restriction information, in a case where printing is permitted as a result of determination concerning print permission for the print job based on the other restriction information.

5. The printing system according to claim 1, wherein
the print management information includes apparatus-by-apparatus restriction information representing print restrictions for each of a plurality of printing apparatus, and user-by-user restriction information representing print restrictions for each user,
each of the plurality of printing apparatus acquires, from the server, a duplication of the apparatus-by-apparatus restriction information on the respective printing apparatus, and stores and manages the acquired duplication, and
the print permission confirmation part determines whether to permit printing based on the user-by-user restriction information stored and managed by the duplication management part and the apparatus-by-apparatus restriction information stored and managed by the respective printing apparatus when the server is unavailable.

6. The printing system according to claim 1, wherein
the print management information includes print restrictions concerning color/monochrome or print restrictions concerning an upper limit number of sheets to be printed.

7. The printing system according to claim 1, wherein
the duplication management part of the printer driver acquires the print management information from the server when the server is accessible, and the printer driver is in an idle state where no processing concerning creation or transmission of a print job is executed, or when a print job is transmitted to the server.

8. The printing system according to claim 1, wherein
the printer driver causes the information processor to operate to further function as a transmission impossibility notifying part that notifies a user of a result of determination when the print permission confirmation part determines that printing concerning the print job is not permitted.

9. The printing system according to claim 1, wherein
the print management information includes at least one of a job history of a user, a user-specified panel setting, and billing information.

10. The printing system according to claim 1, wherein
the duplication management part updates the duplicate print management information when the direct transmission part transmits a print job to the printing apparatus.

11. The printing system according to claim 10, wherein
after updating the duplicate print management information, the duplication management part transmits the updated duplicate print management information to the server when the server is accessible.

12. The printing system according to claim 11, wherein
after updating the duplicate print management information, the duplication management part repeatedly attempts to access the server, and transmits the updated duplicate print management information to the server when the server becomes accessible.

13. The printing system according to claim 11, wherein
the server updates the print management information based on the updated duplicate print management information received from the duplication management part.

14. The printing system according to claim 13, wherein the server updates the print management information based on both of the updated duplicate print management information and the updated management information.

15. The printing system according to claim 14, wherein the server updates the print management information while prioritizing last updated information among information included in the updated duplicate print management information and the updated management information.

16. The printing system according to claim 10, wherein after updating the duplicate print management information, the duplication management part transmits the updated duplicate print management information to the server when transmitting a print job to the server.

17. A non-transitory recording medium storing a computer readable printer driver program causing an information processor to perform:
fulfilling functions of the printer driver according to claim 1.

18. A printing system comprising:
a printer driver;
a server that receives a print job from an information processor on which the printer driver operates, and transfers the received print job to a printing apparatus; and
a printing apparatus that executes the received print job received from the server,
wherein the server includes:
a management part that stores and manages print management information representing print restrictions; and
a hardware processor that determines whether to permit printing concerning a print job created by the printer driver, based on the print management information, and
the printer driver has functions as:
a job creation part that creates a print job;
a duplication management part that acquires a duplication of the print management information held by the server, and stores and manages the acquired duplication;
a confirmation part that confirms whether the server is available;
a print permission confirmation part that requests the server to determine whether to permit printing concerning the print job created by the job creation part if the server is available, and determines whether to permit printing concerning the print job created by the job creation part, by using the duplicate print management information if the server is unavailable; and
a direct transmission part that directly transmits the print job created by the job creation part to the printing apparatus when the print permission confirmation part determines that printing concerning the print job created by the job creation part is permitted;
wherein
the printing apparatus stores and manages management information on the printing apparatus, out of the print management information, and updates the management information when executing the print job, and
when executing the print job received from the direct transmission part, if the server is accessible, the printing apparatus transmits the updated management information to the server, and if the server is inaccessible, the printing apparatus transmits the updated management information to the information processor which is a transmission source of the print job.

19. The printing system according to claim 18, wherein after transmitting the updated management information to the information processor, the printing apparatus transmits the updated management information to the server when the server is accessible.

20. The printing system according to claim 19, wherein the printing apparatus repeatedly attempts to access the server, and transmits the updated management information to the server when the server becomes accessible.

21. The printing system according to claim 18, wherein when receiving the management information from the printing apparatus, the duplication management part updates the duplicate print management information based on the management information.

22. The printing system according to claim 18, wherein the server updates the print management information based on the updated management information received from the printing apparatus.

* * * * *